US008817760B2

(12) United States Patent
Moeller et al.

(10) Patent No.: US 8,817,760 B2
(45) Date of Patent: Aug. 26, 2014

(54) MODEM APPARATUS FOR A MODULAR WIRELESS COMMUNICATION SYSTEM (75) Inventors: Bernd Moeller, Henfenfeld (DE); Werner Johann Anzill, Poecking (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 306 days.

(21) Appl. No.: 13/003,025

(22) PCT Filed: Jun. 25, 2009

(86) PCT No.: PCT/EP2009/057986
§ 371 (c)(1),
(2), (4) Date: Feb. 24, 2011

(87) PCT Pub. No.: WO2010/003831
PCT Pub. Date: Jan. 14, 2010

(65) Prior Publication Data
US 2011/0261796 A1    Oct. 27, 2011

Related U.S. Application Data (60) Provisional application No. 61/079,708, filed on Jul. 10, 2008.

(30) Foreign Application Priority Data

Jul. 9, 2008  (EP) .................................. 08012383

(51) Int. Cl.
*H04W 4/00*           (2009.01)
(52) U.S. Cl.
USPC ........... 370/338; 370/328; 370/466; 370/469; 370/313; 709/245; 709/250; 455/403

(58) Field of Classification Search
None
See application file for complete search history.

(56) References Cited

U.S. PATENT DOCUMENTS

| 2003/0177275 | A1  | 9/2003  | Lind et al.           |
|--------------|-----|---------|-----------------------|
| 2005/0088983 | A1* | 4/2005  | Wesslen et al. ........ 370/313 |
| 2007/0008896 | A1  | 1/2007  | Green et al.          |
| 2008/0244095 | A1* | 10/2008 | Vos et al. ............ 709/250 |

FOREIGN PATENT DOCUMENTS

| EP | 1133208 A2    | 9/2001 |
| EP | 1335566 A1    | 8/2003 |
| EP | 1761076 A2    | 3/2007 |
| EP | 1802147 A2    | 6/2007 |
| JP | 2005526308 A  | 9/2005 |
| WO | 2004062137 A1 | 7/2004 |

OTHER PUBLICATIONS

Berlemann, Lars; Cassaigne, Arnaud, Pabst, Ralf, Walke, Bernhard; (ComNets, RWTH Aachen University, Aachen, Germany) ber/adc/pab/walke@comnets.rwth-aachen.de; "Modular Link Layer Functions of A Generic Protocol Stack for Future Wireless Networks", Nov. 2005; pp. 1-7; http://omidi.iut.ac.ir/SDR/2007/WebPages/07_ProtocolAspects/refrences/BeCaPaWa_SDRforum04.pdf.

(Continued)

*Primary Examiner* — Ian N Moore
*Assistant Examiner* — Eric H Wang
(74) *Attorney, Agent, or Firm* — Coats & Bennett, P.L.L.C.

(57) ABSTRACT

A modem apparatus for a modular wireless communications system is presented. The modem apparatus is configured to provide wireless network access in accordance with a wireless communications standard such as LTE or UMTS. The modem apparatus comprises a hardware sub-system, a layered software sub-system as well as an interface sub-system.

16 Claims, 5 Drawing Sheets

(56) References Cited

OTHER PUBLICATIONS

Ghosh, Angana; Olsson, Magnus, Persson, Patrik; "Open Application Environments in Mobile Devices: Focus on JME and Ericsson Mobile Platforms", Feb. 2005; pp. 82-91; Ericsson Review No. 2.; 2005.

Berlemann, Lars, Pabst, Ralf, Walke, Bernhard; "Multimode Communication Protocols Enabling Reconfigurable Radios", EURASIP Journal on Wireless Communications and Networking 2005:3, Received Sep. 24, 2004, Revised Feb. 21, 2005; pp. 390-400.

* cited by examiner

MODEM APPARATUS FOR A MODULAR WIRELESS COMMUNICATION SYSTEM

TECHNICAL FIELD

The present invention generally relates to a modem apparatus. In particular, the invention is directed to a modem apparatus that can be deployed in a modular environment.

BACKGROUND

Network access points such as those used in Local Area Networks (LANs), Wireless LANs (WLANs) and cellular networks are becoming ubiquitous. From the perspective of a high connectivity it is therefore only a logical consequence that many mobile devices provide support for more than one Network Access Technique (NAT).

WO-A-00/22857 teaches a modular approach in which different network access modules (such as a Local Area Network (LAN) module and a Global System for Mobile communications (GSM) module) are interconnected via a communication bus according to the Universal Serial Bus (USB) standard. Other modules connected to the communication bus such as a Closed-Circuit Television (CCTV) module may then selectively transmit signals via the LAN module on the one hand or via the GSM module on the other.

A. Ghosh et al., "Open application environments in mobile devices: Focus on JME and Ericsson Mobile Functional modules", Ericsson Review No. 2, Vol. 82, 2005, pages 82 to 91 (ISSN: 0014-0171) describe a further modular approach for mobile devices. This approach is based on a functional module in the form of mobile platform with a digital baseband processor supporting one or more Radio Access Techniques (RATs) such as General Packet Radio Service (GPRS), Enhanced Data for GSM Evolution (EDGE) or Wideband Code-Division Multiple Access (WCDMA). The mobile platform module is an environment that includes all the necessary integrated circuits and software needed to provide wireless network access services and communication services (e.g. for voice, data or multimedia applications), as well as interfaces to make these services available to applications residing within or logically on top of the mobile platform module.

The software and hardware architecture of mobile platform module proposed by Gosh et al. is structured into layers and stacks (see also WO 03/069463). The uppermost layer is an application layer comprising customer and operator applications. A middleware layer permits the applications to access different services that are arranged in individual vertical software stacks. Such services include network access services, data communication services, user interface and codec services, basic application services and operation services. The software stacks are located on top of a hardware abstraction layer, which again provides the appropriate interfaces to the hardware, including GPRS, EDGE and WCDMA components.

EP 1 133 208 A2 teaches a wireless modem comprising a radio board and a digital board. The modem has an interface to output a standard 10Base-T data stream to a personal computer.

EP 1 335 566 A1 relates to a mobile telephone comprising a wireless modem module. The wireless modem module is connected together with a control signal interface and a Personal Digital Assistant (PDA) device to a main controller of the mobile telephone.

In accordance with the modular approach taught by Gosh et al., the mobile platform module may be co-located with an application platform module including a third-party application processor in a mobile device. The third party processor is configured to handle all applications and multimedia functionalities, and the mobile platform module need thus only handle a reduced set of functionalities, such as providing access to a mobile communications network.

SUMMARY

Accordingly, there is a need for a technical realization of an apparatus capable of providing wireless network access services to a client.

According to a first aspect, a modem apparatus configured to provide wireless network access in accordance with at least one first wireless communications standard is provided. The modem apparatus comprises: a hardware sub-system configured in accordance with the at least one first wireless communications standard and comprising baseband processing and Radio Frequency components; a layered software sub-system comprising an upper software layer with a data application configured to provide modem services and a lower software layer with a first vertical software stack configured to provide network access services to the data application in accordance with the at least one first wireless communications standard and a second vertical software stack configured to provide local data communication services; and an interface sub-system for providing the modem services to a client, wherein the interface sub-system comprises one or more standardized physical interfaces.

The terms "upper" and "lower" as used with respect to software and hardware layers herein are only relative indications. For example, a "lower" software layer is low with respect to a "higher" software layer, and there may still exist software layers below the "lower" software layer (for which the "lower" software layer will then be an "upper" software layer).

Generally, the modem services provided by the data application may relate to a control of a wireless communication session involving the components of the hardware sub-system. The data application may be configured to generate, process or forward high level modem commands (such as ITU-T commands or commands of the Hayes command set, also called AT commands) for controlling the modem services of the modem apparatus.

According to a first variant, the modem apparatus is configured to provide the modem services via the interface sub-system to a client external to the device in which the modem apparatus is installed. According to a second variant (that may be combined with the first variant), the modem apparatus is configured to provide the modem services via the interface sub-system to a client located internally within the device. The modem apparatus may have a modular configuration to be selectively deployed as a stand-alone apparatus for providing the modem services to the external client and/or to be co-located with the internal client in the device for providing the modem services to the internal client. The modem apparatus may thus act as a network access platform module.

Each vertical software stack included in the lower software layer may comprise two or more individual software components. The vertical software stacks may each be an essentially self-contained silo, which means that any inter-stack communication between the software components may be disabled or at least reduced to a large extent. Each vertical software stack may internally have a layered structure.

The lower software layer of the modem apparatus may further comprise a third vertical software stack configured to provide operational services for the modem apparatus. The operational services provided by the third vertical software stack may comprise at least one of system control, radio control, Universal Integrated Circuit Card (UICC) access (including Subscriber Identity Module, or SIM, access), clock server access, Internal Radio Access Technology (IRAT) handover, telephone book services, proxy management, component management, update management, and performance management.

The modem apparatus may have a "thin" configuration and may thus lack any user interface and multimedia capabilities. In such a "thin" configuration, software stacks for providing user interface services and multimedia services may thus be omitted in the lower software layer. For example, the lower software layer may exclusively consist of the first vertical software stack, the second vertical software stack and the third vertical software stack.

The local data communication services provided by the second vertical software stack may relate to a communication between the modem apparatus and another component co-located with the modem apparatus in a single device. Additionally, or in the alternative, the local data communication services may relate to a communication between the modem apparatus (or a device hosting the modem apparatus) on the one hand and a nearby access point of, for example, a local area network.

The data communications services provided by the second vertical software stack may comprise at least one of Universal Serial Bus (USB) interface services, General Purpose Input Output (GPIO) interface services, Universal Asynchronous Receiver and Transmitter (UART) interface services, Infrared Data Association (IrDA) interface services, Digital RF interface services, Wireless Local Area Network (WLAN) services, Worldwide Interoperability for Microwave Access (WiMAX) services, AT command management, and Internet Protocol services.

In one realization, the software sub-system further comprises a middleware layer configured to allow applications installed within the device to access the services provided by the lower software layer. Such applications may be installed on the upper software layer of the modem apparatus and/or within a separate apparatus co-located with the modem apparatus within the device.

The interface sub-system of the modem device may comprise one or more standardized (or "open") physical interfaces such as at least one of a Universal Serial Bus interface (e.g., for the transfer of user data at a high data rate), a General Purpose Input Output interface (e.g., for the transfer of modem wake-up and time synchronization signals), a Universal Asynchronous Receiver and Transmitter interface (e.g., for the transfer of control data and user data at a low data rate) and a Digital RF interface (e.g., for combining several network access technologies or platforms into one radio front-end). Proprietary interfaces (such as memory-mapped interfaces) may thus be omitted in the interface sub-system to reduce integration efforts and to enhance the modular re-usability of the modem apparatus in different deployment variants.

The one or more physical interfaces may form the basis of well-defined logical communication interfaces. Such logical communication interfaces may include a link handler of an operating system, a dedicated interface application in combination with an appropriate device driver, the Distributed Ericsson Component Model (DECM), and so on. The modem apparatus may comprise multiple such logical communication interfaces.

The at least one first wireless communications standard may be a mobile (e.g. cellular) communications standard. For example, the at least one first wireless communications standard may selected from the group comprising the Long Term Evolution (LTE) standard and the High Speed Packet Access (HSPA) Evolution standard.

The modem apparatus may be configured as a circuit board. Moreover, the modem apparatus may be realized using one or more Digital Signal Processors (DSPs) and/or one or more Application Specific Integrated Circuits (ASICs).

As mentioned above, the modem apparatus may be adapted to be re-used in different configurations according to a modular approach. The modem device may, for example, be configured such that it can be used either as a stand-alone module or, in the alternative, in a dual (or triple etc.) mode configuration together with one or more other modules. In the latter case, two or more functional modules (such as the modem apparatus and the internal client) will be co-located in one and the same device and configured to communicate with each other.

According to a further aspect, a device comprising the modem apparatus discussed herein is provided. In a configuration in which the modem apparatus is adapted to provide the modem services via the interface sub-system to a client external to the device, the device may further comprise a data interface for establishing a data and/or control connection to the external client. The data interface may be coupled to the interface sub-system of the modem apparatus.

According to a first variant, the modem apparatus may be deployed as a stand alone apparatus in the device. According to a second deployment variant, the modem apparatus is co-located with an internal client in the device and the internal client may be coupled to the interface sub-system of the modem apparatus. Both variants may be combined as needed.

The internal client may be configured to also act as a service provider. For example, the internal client may provide wireless (e.g. cellular) network access services in accordance with at least one second wireless communications standard to the device incorporating the modem apparatus and/or to an external device attached thereto. The at least one second wireless communications standard may be selected from the group comprising the Global System for Mobile communications standard, the Universal Mobile Telecommunications Standard (UMTS) and the High Speed Packed Access standard. In a device configuration supporting two or more different wireless communications standards, an IRAT handover mechanism may be implemented to allow for a handover between different network access technologies.

In a scenario in which the internal client is configured to also act as a service provider, the internal client may be configured to provide at least one of user interface services and multimedia services. Other exemplary services that may be provided include at least one of network access (and in particular wireless, e.g. cellular, network access using, e.g., the Radio Frequency components of the modem apparatus), mass data storage, audio services, video services, Digital Rights Management (DRM) services, Object Exchange (OBEX) services, application services and device management services.

The device may generally be configured as a data (or modem) card, a mobile telephone, a Personal Digital Assistant (PDA), a Personal Computer (PC), a digital camera (e.g. a photo or video camera), or a combination thereof.

The device may be a finished product suitable for sale to an end customer or, in the alternative, a semi-finished product. The finished product may comprise the modem apparatus (i.e., a network access platform module) alone or in combination with an internal client (e.g., an application platform module or a network access platform module). The semi-finished product may, for example, not yet comprise the internal client but only the contacting structure to receive a functional module comprising the internal client. The semi-finished product may, for example, be realized in the form of one or more Printed Circuit Boards, or PCBs. The contacting structure may include a chip socket, solder bumps, or the like.

BRIEF DESCRIPTION OF THE DRAWINGS

Further aspects and advantages of the techniques presented herein will become apparent from the following description of preferred embodiments and from the drawings, wherein.

DESCRIPTION OF PREFERRED
EMBODIMENTS

In the following description of preferred embodiments, for purposes of explanation and not limitation, specific details are set forth (such as particular interfaces, network access technologies and device configurations) in order to provide a thorough understanding of the present invention. It will be apparent to one skilled in the art that the present invention may be practised in other embodiments that depart from these specific details. For example, while the embodiments will primarily be described in context with third and fourth generation mobile communications system according to the UMTS and LTE standards, respectively, it will be evident that the invention can also be practised in connection with other third or fourth generation mobile communications standards (such as HSPA Evolution) and in connection with second generation mobile communications technologies according to, for example, the GSM standard.

Moreover, those skilled in the art will appreciate that the services, functions and steps explained herein below may be implemented using software functioning in conjunction with a programmed microprocessor, an ASIC, a DSP or a general purpose computer. It will also be appreciated that while the following embodiments will primarily be described in context with devices, the invention may also be embodied in a system comprising a computer processor and a memory coupled to the processor, wherein the memory is encoded with one or more programs that may perform at least some of the services, functions and steps disclosed herein.

Figure 1:
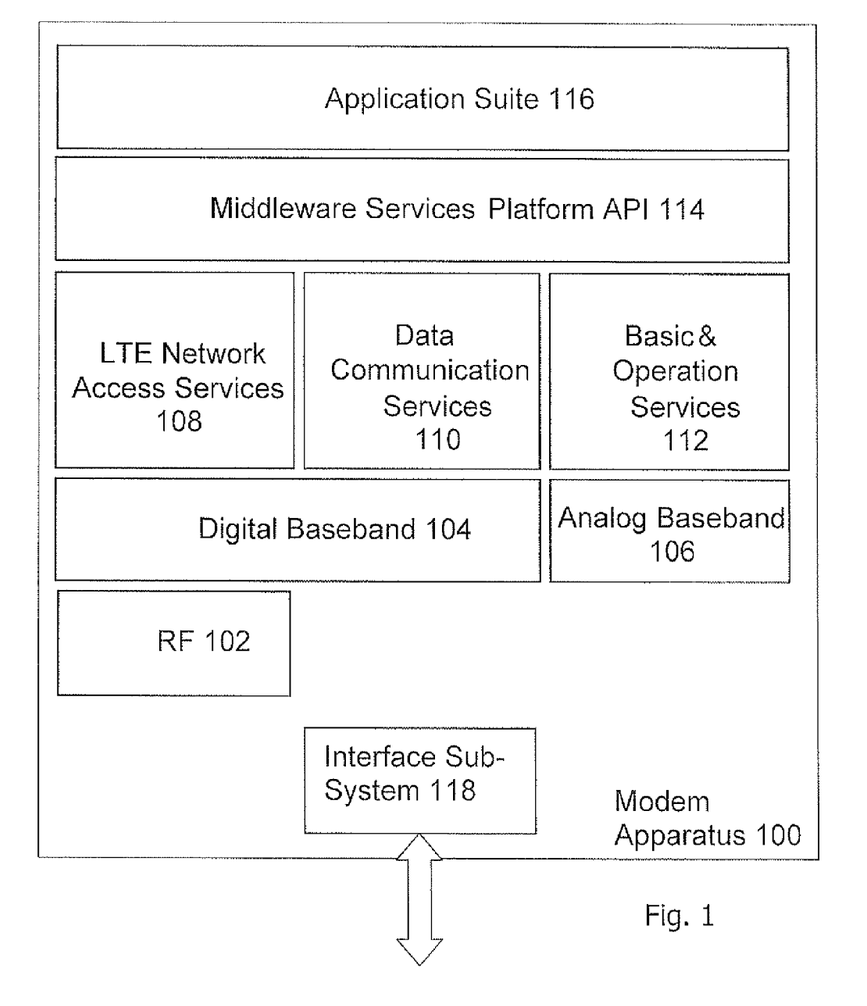
FIG. 1 shows a first block diagram of an exemplary apparatus embodiment.

FIG. 1 shows a block diagram of an embodiment of a modem apparatus 100 configured to provide wireless network access in accordance with the LTE standard. The modem apparatus 100 comprises software and hardware components that are arranged in layered architectures.

The hardware components comprise a Radio Frequency front-end component 102 on the lowest hardware layer and a digital baseband processing component 104 as well as an analog baseband processing component 106 on an upper hardware layer. The software architecture is structured into an upper software layer with an application suite 116, a middleware layer providing an Application Programming Interface (API) 114 and a lower software layer with three vertical software stacks 108, 110, 112. The first vertical software stack 108 is configured to provide network access services to a data application of the application suite 116 in accordance with the LTE standard. The second vertical software stack 110 is configured to provide local data communication services for communication between the modem apparatus 100 and other components or modules of a device (not shown) incorporating the modem apparatus 100. Such data communications services may comprise USB interface services, GPIO interface services, UART interface services, Digital RF interface services, and so on. The third vertical software stack 112 is configured to provide operational services for the modem apparatus. Such operational services include system control, radio control, SIM access, and so on.

The modem apparatus 100 further comprises an interface sub-system 118 with software interface components and hardware interface components. At least some of the software interface components may be included in the second vertical software stack 110, and at least some of the hardware interface components may be included in the digital baseband component 104. The interface sub-system 118 provides a client (not shown in FIG. 1) with access to the modem services provided by the modem apparatus 100.

The modem apparatus 100 shown in FIG. 1 thus includes all the required hardware and software components to be deployed as a stand-alone apparatus in a device (such as a data card) providing modem services in relation to a client requesting the modem services. It should be noted that in the present embodiment the lower software layer exclusively consists of the three software stacks 108, 110, 112. In other words, the modem apparatus 100 is not intended or configured to provide user interface services (e.g., a Man-Machine-Interface, or MMI) or multimedia services (such as voice or video services). If such services are required, the modem apparatus 100 can be co-located in a modular fashion with another apparatus providing the required services.

Figure 2:
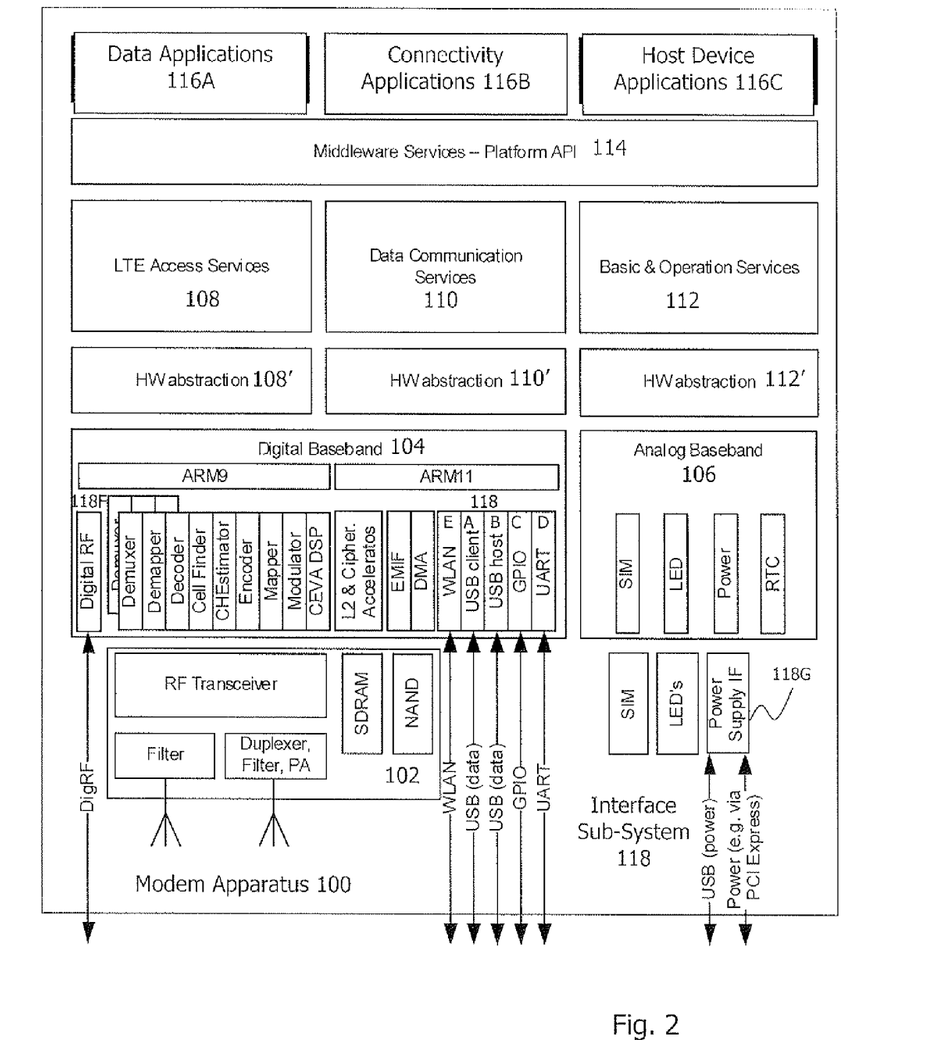
FIG. 2 shows a more detailed second block diagram of the apparatus embodiment of FIG. 1.

FIG. 2 shows further details of the modem apparatus 100 depicted in FIG. 1. As shown in FIG. 2, the application suite 116 comprises three individual application types 116A, 116B, 116C associated with the individual vertical software stacks 108, 110, 112, respectively. Specifically, data applications 116A are configured to control the (exemplary) LTE network access services 108 in accordance with high-level commands (such as "dial number XYZ"). Connectivity applications 116B are configured to identify the individual device-internal connections that are to be set up (for example, via the interface sub-system 118) and to control the data communications services 110 accordingly. Finally, host device applications 116C are configured, interalia, to control client devices (such as cameras, PDAs, TVs, and so on) coupled to the interface sub-system 118 of modem apparatus 100 and to communicate with the basic and operation services 112 accordingly.

For each of the three software stacks 108, 100, 112 a dedicated hardware abstraction component 108', 110', 112' is provided. The hardware abstraction components 108', 110', 112' include hardware drivers required to control the hardware components of the modem apparatus 100. As shown in FIG. 2, these hardware components include the Radio Frequency front-end 102, the digital baseband component 104, the analog baseband component 106 as well as the remaining hardware components of the interface sub-system 118.

The configuration of the Radio Frequency front-end 102 (Radio Frequency transceiver, filters, duplexer, and so on) and the configuration of the analog baseband component 106 (optional SIM, power supply, LED control, and so on) are generally known to the skilled artisan, and therefore a more detailed description thereof is omitted here. Also the configuration of the digital baseband component 104 is to a large extent known to the skilled artisan (ARM9 and ARM11 processors, demuxers, demappers, decoders, and so on). For this reason, only the specific interface functionalities of the digital baseband component 104, which are encompassed by the interface sub-system 118, are in the following described in more detail.

The interface functionalities of the interface sub-system 118 with respect to clients co-located with the modem apparatus 100 in the same device or located in an external device are in the present embodiment based on the USB standard. Accordingly, the interface sub-system 118 of the modem apparatus 100 comprises electrical USB terminals (not shown in FIG. 2) as well as USB client circuitry 104A and USB host circuitry 104B, both integrated in the digital baseband component 104. The USB client circuitry 104A is used for connecting the modem apparatus 100 to external USB host devices like PCs and laptops requiring modem services. Such connections can be performed directly via the USB interface, via a PC Card interface or via a Peripheral Component Interconnect (PCI) Express interface. The USB host circuitry 104B is used to connect the modem apparatus 100 to USB client devices such as digital video or photo cameras, PDAs, TVs, and so on. Moreover, the USB host circuitry 104B can also be used as an interface to another apparatus (such as another mobile network access platform module or an application platform module) co-located with the modem apparatus 100 in one and the same device. Control signalling (e.g., for IRAT handover, UICC/SIM access, inter-platform communication and service control) can be implemented via the USB interface as well.

For intra-device (e.g., inter-platform or inter-module) communication two further standardised interfaces are included in the interface sub-system 118. Specifically, as shown in FIG. 2, the interface sub-system 118 further comprises a GPIO interface 104C and a UART interface 104D, which are both used for the transfer of control information and low rate user data between two or more co-located modules. These interfaces 104C, 104D may, for example, be utilised to synchronise the LTE access technology provided by the modem apparatus 100 (e.g., an LTE quarter-sample counter) with another access technology provided by a second network access platform module (e.g., a W-CDMA quarter-chip counter) co-located with the modem apparatus 100 in one and the same device. Moreover, one or both of the interfaces 104C, 104D could also be used to trigger wake-up of the modem apparatus 100 by another module.

For the transfer of user data between the Radio Frequency front-end 102 and the digital baseband component 104 (or a remote digital baseband component of a network access platform module co-located with the modem apparatus 100), the interface sub-system 118 comprises a Digital RF interface 104F within the digital baseband component 104. The Digital RF interface 104F may also be used for multiplexing control signals for the Radio Frequency front-end 102 from different (e.g., co-located) controllers.

The interface sub-system 118 additionally comprises a WLAN interface 104E that is again partially located within the digital baseband component 104. The standardised WLAN interface 104E is used for an optional WLAN access in a WLAN coverage area. The interface sub-system 118 also comprises a power supply connection interface 118G (e.g., via USB or PCI) to supply the modem apparatus 100 with the power required for its operation.

In addition to the physical interfaces discussed thus far, the modem apparatus 100 comprises one or more logical interfaces for logically coupling the modem apparatus 100 (via the physical interfaces) to another module (e.g., a network access platform module or an application platform module) co-located with the modem apparatus 100 in the same device. According to a first logical interface concept, inter-module communication is using a link handler capability of the operating system to establish inter-processor communication. According to another concept for a logical interface, inter-module communication uses dedicated applications and the corresponding device drivers to connect dedicated software components and interfaces between the modules. As a third logical interface concept, the so-called Distributed Ericsson Component Model (DECM) can be mentioned. Two or more of these or other logical interface concepts may be implemented in combination.

The logical interfaces may be used for the transfer of control and user data between two or more modules located within the same device. For example, the logical interfaces may be used to transfer IRAT handover signalling between the modules, to perform a remote control of one module (e.g., of the modem apparatus 100 shown in FIG. 2) by another module (e.g., by a W-CDMA platform module co-located with the modem apparatus 100), for remote UICC/SIM access (e.g., for accessing by the modem apparatus 100 a UICC/SIM connected to another network access platform module), and so on.

Figure 3:
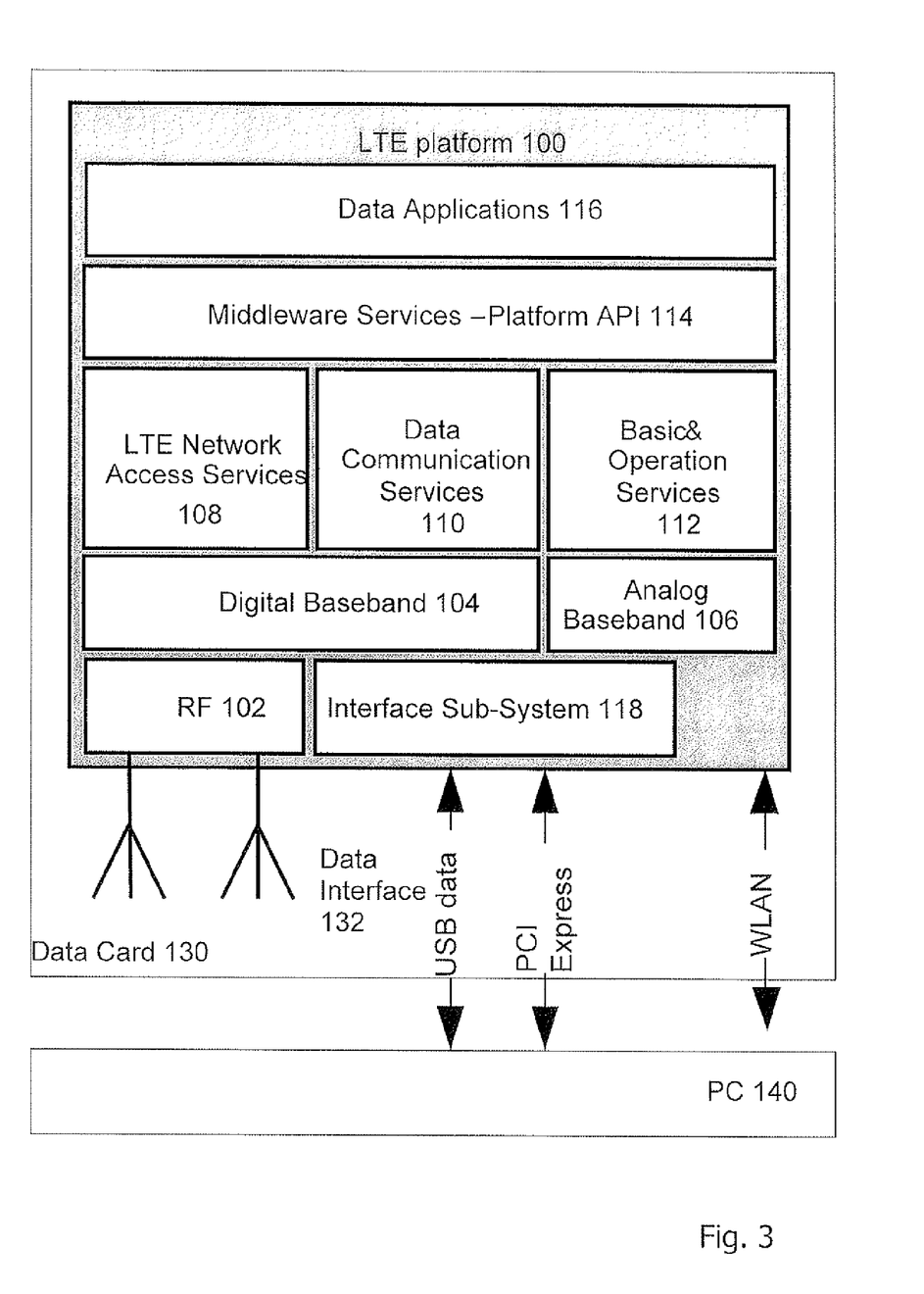
FIG. 3 shows a block diagram of an exemplary first device embodiment with a modem apparatus in a stand-alone configuration.

FIG. 3 shows an embodiment of a device 130 including in a stand-alone system configuration the modem apparatus 100 discussed in combination with FIGS. 1 and 2 above. In the exemplary embodiment of FIG. 3, the modem apparatus 100 is an LTE platform module installed in a single mode data card 130. In the data card 130, the LTE platform module 100 works as a stand-alone communications system (modem) with respect to an external device, such as a laptop or PC 140. Specifically, the data card 130 has an USB data interface 132 extending the USB data interface of the interface sub-system 118 to the PC 140. From the perspective of the PC 140, the LTE platform module 100 is an USB client that is physically part of a PCI Express interface. Optionally, the LTE platform module 100 can also comprise a WLAN interface as shown in FIG. 3.

In the stand-alone configuration illustrated in FIG. 3, the analog baseband component 106 includes a SIM interface (see FIG. 2) and power management functionalities. Power is supplied via the PCI Express interface. The data application 116 of the LTE platform module 100 contains a conventional data card application suite for providing modem services.

Figure 4:
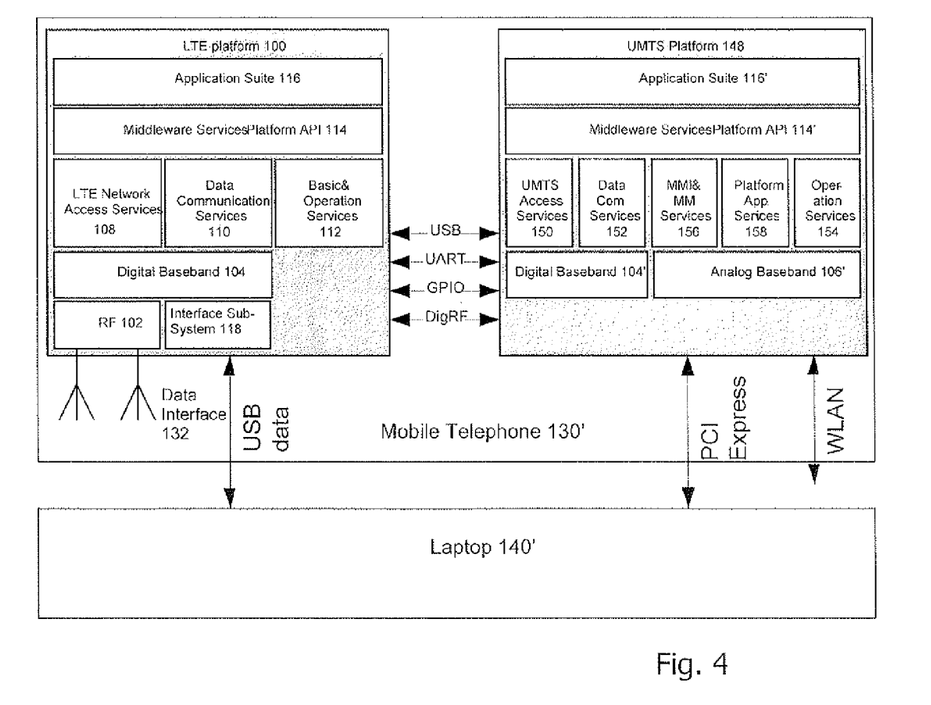
FIG. 4 shows a block diagram of an exemplary second device embodiment with a modem apparatus in a dual-mode configuration co-located with a network access apparatus having a known internal configuration.

FIG. 4 shows an embodiment of a dual mobile device in the form of a mobile telephone 130', comprising an LTE platform module 100 as well as an UMTS platform module 148. The LTE platform module 100 is configured as discussed in combination with FIGS. 1 and 2 above. The UMTS platform module 148 provides functionalities of a conventional UMTS telephone. These functionalities are based on a five stack software architecture including, in addition to UMTS access services 150, data communications services 152 and operation services 154, also user interface (MMI) and multimedia services 156 as well as platform application services 158. Moreover, the UMTS platform module 148 comprises a digital baseband component 104', an analog baseband component 106', middleware services 114' and an application suite 116'.

The LTE platform module 100 works as an LTE co-processor towards the UMTS platform module 148. The inter-module communication is performed via USB and associated GPIO and UART interfaces, as illustrated in FIG. 4. In relation to the modem services provided over the USB interface, the LTE platform module 100 acts as USB host, while the UMTS platform module 148 acts as USB client.

As shown in FIG. 4, the Radio Frequency front-end 102 (including a Radio Frequency transceiver) is shared between the two platform modules 100, 148 and located on the LTE platform module 100. For this reason, a Digital RF interface is provided between the two modules 100, 148 to provide the UMTS platform module 148 with access to the Radio Frequency front-end 102 of the LTE platform module 100. The LTE platform 100 comprises Digital RF switching capabilities to switch between the Digital RF data streams of the LTE- and the UMTS platform modules 100, 148 (for example, in case of IRAT measurements).

While the Radio Frequency front-end 102 is located on the LTE platform module 100, analog baseband processing is completely handled on the side of the UMTS platform module 148 by the analog baseband component 106'. Power for the LTE platform module 100 is supplied via the UMTS platform module 148.

The mobile telephone 130' has a dual mode configuration which permits the mobile telephone to provide LTE and UMTS modem (including telephony) services to the applications of the application suite 116' or to an external client, such as a laptop 140'. For providing LTE and UMTS services to the external client 140, a USB interface to the laptop 140' is used. Physically, the USB interface to the laptop 140' is part of the PCI Express interface. When providing modem services to the laptop 140', the LTE platform module acts as USB client, whereas the laptop 140' acts as USB host.

In the embodiment illustrated in FIG. 4, a WLAN interface is hosted by the UMTS platform module 148. In the case the WLAN Internet Connect Sharing (ICS) use case is to be supported, the WLAN interface may be moved to the LTE platform module 100. This approach has the advantage that the whole user data part is kept in one single platform module.

The application suite 116 on the LTE platform module 100 is reduced to the minimum and basically only supports inter-module communication as well as LTE modem applications. The application suite 116' on the side of the UMTS platform module 148 contains the complete set of applications for a mobile telephone.

Figure 5:
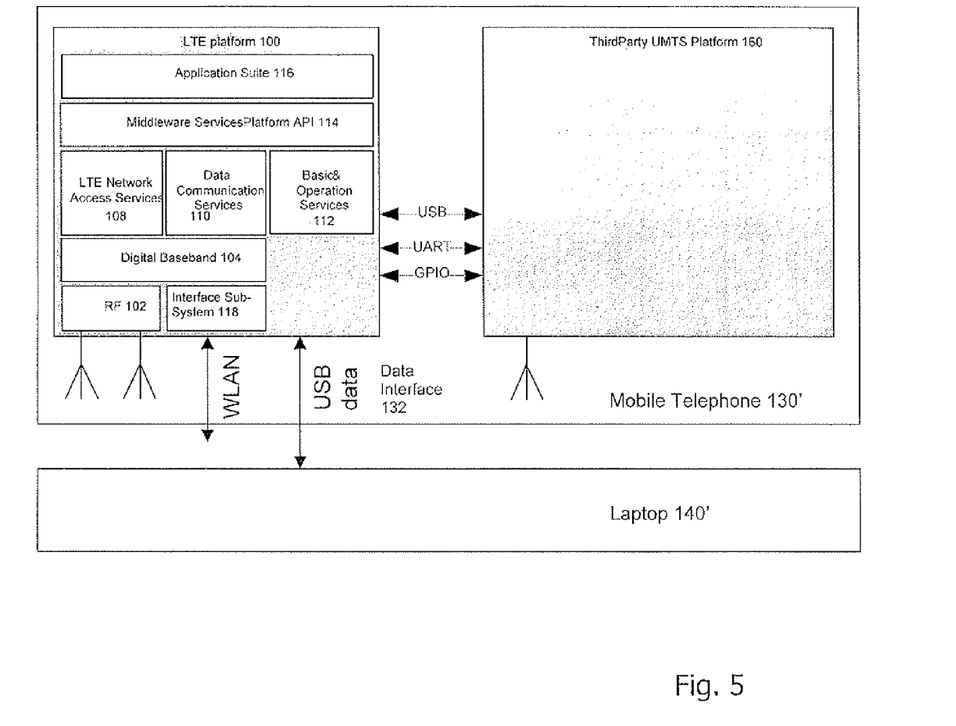
FIG. 5 shows a block diagram of an exemplary third device embodiment with a modem apparatus in a dual-mode configuration co-located with a network access apparatus with an unknown internal configuration.

FIG. 5 shows another embodiment of a device in the form of a mobile telephone 130' incorporating an LTE platform module 100 as well as an UMTS platform module 160. The LTE platform module 100 may have a configuration as discussed above in context with the modem apparatus of FIGS. 1 and 2. The UMTS platform module, on the other hand, may be based on a third-party platform having an arbitrary (and typically unknown) hardware and software architecture.

The LTE platform module 100 again works as an LTE co-processor towards the UMTS platform module 160. The communication between the two modules 100, 160 is advantageously realised by the standardised USB interface and an associated (and likewise standardised) GPIO interface. If supported by the UMTS platform module 160, an UART interface can additionally be utilised for inter-module communication. As regards the USB interface, the LTE platform module 100 acts as USB host, while the UMTS platform 160 module acts as USB client.

Both, the LTE platform module 100 and the UMTS platform module 160, have their dedicated Radio Frequency components. In other words, while the LTE platform module 100 handles the LTE Radio Frequency processing (via RF component 102), the UMTS platform module 160 handles the UMTS Radio Frequency processing. The analog baseband processing, including the SIM interface and power supply, is completely handled on the side of the UMTS platform module 160 (i.e., power is supplied to the LTE platform module 100 from the UMTS platform module 160). For providing LTE and UMTS modem services to an external client, such as a laptop 140', an USB interface towards the laptop 140' is located on the LTE platform module 100. This USB interface is also utilised by the UMTS platform module 160 in the case the laptop 140' requests UMTS modem services. The LTE platform module may have USB On-The-Go (OTG) functionalities. A WLAN interface, if not part of the UMTS platform module 160, is hosted by the LTE platform module 100. Although not shown in FIG. 5, a Digital RF interface may also be provided between the two platform modules 100, 160.

The application suite 116 of the LTE platform module 100 may be reduced to a minimum, basically only supporting the inter-module communication. On the other hand, the application on the side of the UMTS platform module 160 may contain the complete set of applications typically installed on a mobile telephone.

As has become apparent from the above embodiments, the techniques presented herein provide a very flexible communication modem solution that can be configured and implemented with minor additional efforts in different system configurations.

The whole interface concept is based on standardised interfaces, which will be available in most network access platform modules and application platform modules. Based on these standardised interfaces, inter-module communication such as IRAT handover mechanisms or UICC/SIM access can be implemented in a very efficient way.

An individual modem apparatus can either be implemented as a cost competitive stand-alone solution (e.g., as an alternative to WiMAX devices) or in dual (or triple, etc.) mode platform devices. In such multi-mode platform devices, the approach proposed herein allows to add new access technologies to existing mobile systems with shortest time-to-market and lowest additional design efforts and costs. Moreover, network access technologies can be added with little design efforts in any device that needs wireless connectivity, like cameras, mobile TVs, PDAs, and so on. Also, an independent scaling and independent updates of new access technologies from existing access technologies and application systems can be provided.

It is believed that many advantages of the embodiments will be fully understood from the forgoing description. It will be apparent that various changes may be made in the form, construction and arrangement of the exemplary aspects thereof without departing from the scope of the invention or without sacrificing all of its advantages. Since the invention can be varied in many ways, it will be recognised that the invention should be limited only by the scope of the following claims.

The invention claimed is:

1. A modem apparatus configured to provide wireless network access in accordance with at least one first wireless communications standard, the modem apparatus comprising:
   a hardware sub-system configured in accordance with the at least one first wireless communications standard and comprising baseband processing and Radio Frequency (RF) components;
   an interface sub-system configured to provide modem services to a client and comprising one or more standardized physical interfaces, wherein the interface sub-system is configured to provide the modem services to at least one of a client external to the device and a client located internally within the device, and wherein the modem apparatus has a modular configuration to be selectively deployed as at least one of a stand-alone apparatus for providing the modem services to the external client and an apparatus co-located with the internal client for providing the modem services to the internal client; and a layered software sub-system comprising an upper software layer and a lower software layer, the upper software layer including a data application configured to provide said modem services and the lower software layer comprising first, second, and third vertical software stacks, wherein any inter-stack communication between software components of the vertical software stacks is disabled, and wherein:

the first vertical software stack is configured to provide network access services to the data application in accordance with the at least one first wireless communications standard;

the second vertical software stack is configured to provide local data communication services for communication between the modem apparatus and other components or modules of a device incorporating the modem apparatus; and the third vertical software stack is configured to provide operational services for the modem apparatus comprising system control, radio control, and Subscriber Identity Module (SIM) access.

2. The modem apparatus of claim 1, wherein the interface sub-system is configured to provide the modem services to a client external to the device.

3. The modem apparatus of claim 1, wherein the interface sub-system is configured to provide the modem services to a client located internally within the device.

4. The modem apparatus of claim 1, wherein the modem apparatus lacks user interface and multimedia capabilities.

5. The modem apparatus of claim 1, wherein the operational services provided by the third vertical software stack further comprise at least one of: Universal Integrated Circuit Card (UICC) access, clock server access, telephone book services, proxy management, component management, update management, and performance management.

6. The modem apparatus of claim 1, wherein the data communications services provided by the second vertical software stack comprise at least one of" Universal Serial Bus (USB) interface services, General Purpose Input Output (GPIO) interface services, Universal Asynchronous Receiver and Transmitter (UART) interface services, Infrared Data Association (IrDA) interface services, Digital RF interface services, Wireless Local Area Network (WLAN) services, Worldwide Interoperability for Microwave Access (WiMAX) services, AT command management, and Internet Protocol services.

7. The modem apparatus of claim 1, wherein the one or more standardized physical interfaces include at least one of a Universal Serial Bus (USB) interface, a General Purpose Input Output (GPIO) interface, a Universal Asynchronous Receiver and Transmitter (UART) interface, and a Digital RF interface.

8. The modem apparatus of claim 1, wherein the at least one first wireless communications standard comprises either the Long Term Evolution (LTE) standard or the High Speed Packet Access (HSPA) Evolution standard.

9. The modem apparatus of claim 1, wherein the modem comprises a circuit board.

10. A device comprising a modem apparatus configured to provide wireless network access in accordance with at least one first wireless communications standard, the modem apparatus comprising:

a hardware sub-system configured in accordance with the at least one first wireless communications standard and comprising baseband processing and Radio Frequency (RF) components;

an interface sub-system configured to provide modem services to a client and comprising one or more standardized physical interfaces, wherein the interface sub-system is configured to provide the modem services to a client external to the device; and a layered software sub-system comprising an upper software layer and a lower software layer, the upper software layer including a data application configured to provide said modem services and the lower software layer comprising first, second, and third vertical software stacks, wherein any inter-stack communication between software components of the vertical software stacks is disabled, and wherein:

the first vertical software stack is configured to provide network access services to the data application in accordance with the at least one first wireless communications standard;

the second vertical software stack is configured to provide local data communication services for communication between the modem apparatus and other components or modules of said device; and the third vertical software stack is configured to provide operational services for the modem apparatus comprising system control, radio control, and Subscriber Identity Module (SIM) access; and a data interface coupled to the interface sub-system and configured to establish a data connection to the external client.

11. The device of claim 10, wherein the modem apparatus is deployed as a stand alone apparatus in the device.

12. The device of claim 10, further comprising an internal client coupled to the interface sub-system.

13. The device of claim 12, wherein the internal client is configured to provide wireless network access services in accordance with at least one second wireless communications standard.

14. The device of claim 13, wherein the at least one second wireless communications standard comprises either the Global System for Mobile communications (GSM) standard, the Universal Mobile Telecommunications Standard (UMTS), and the High Speed Packed Access (HSPA) standard.

15. The device of claim 12, wherein the internal client is configured to provide at least one of user interface services and multimedia services.

16. The device of claim 10, wherein the device comprises a data card, a mobile telephone, a personal digital assistant, a Personal Computer (PC), or a camera.

* * * * *